United States Patent [19]
Bensaoula et al.

[11] Patent Number: 5,927,325
[45] Date of Patent: Jul. 27, 1999

[54] MICROELECTROMECHANICAL MACHINED ARRAY VALVE

[75] Inventors: Abdelhak Bensaoula, Houston; John Gregory Hollingshead; Lawrence Frank Latham, Jr., both of Austin, all of Tex.

[73] Assignee: Inpod, Inc., Austin, Tex.

[21] Appl. No.: 08/736,970

[22] Filed: Oct. 25, 1996

[51] Int. Cl.$^6$ .............................. G05D 7/06; F16K 7/14; F16K 31/02

[52] U.S. Cl. ................... 137/599; 137/375; 251/129.06; 251/331

[58] Field of Search .............................. 251/129.06, 331, 251/368; 137/561 R, 599, 375

[56] References Cited

U.S. PATENT DOCUMENTS

| | | | |
|---|---|---|---|
| 3,726,296 | 4/1973 | Friedland et al. | 137/599 X |
| 3,827,457 | 8/1974 | Vutz et al. | 137/599 |
| 3,901,731 | 8/1975 | Warszawski et al. | 137/599 X |
| 3,942,553 | 3/1976 | Gallatin | 137/599 |
| 4,170,245 | 10/1979 | Haley | 137/599 X |
| 4,191,215 | 3/1980 | Gonner | 137/599 X |
| 4,756,508 | 7/1988 | Giachino et al. | 251/331 |
| 4,842,017 | 6/1989 | Reynolds | 251/129.06 X |
| 4,875,658 | 10/1989 | Asai | 251/368 X |
| 5,080,131 | 1/1992 | Ono et al. | 137/599 |
| 5,161,774 | 11/1992 | Engelsdorf et al. | 251/331 X |
| 5,246,035 | 9/1993 | Skyllingstad et al. | 251/368 X |
| 5,287,873 | 2/1994 | Vehet | 137/561 R X |
| 5,314,164 | 5/1994 | Smith | 251/129.17 |

*Primary Examiner*—John Rivell
*Attorney, Agent, or Firm*—Baker & Botts, L.L.P.

[57] ABSTRACT

A valve to allow digitally addressable flow controllers is provided. An array of micromachined valves having a range of flow capacities and individually addressable while functioning in an On/Off mode allows flow controllers and similar devices high resolution, linearity and reproducibility. The incorporation of diamond or diamond-like materials in all flow paths extends the application of the valves to corrosive materials and permits higher process temperatures and lower particulate generation.

10 Claims, 5 Drawing Sheets

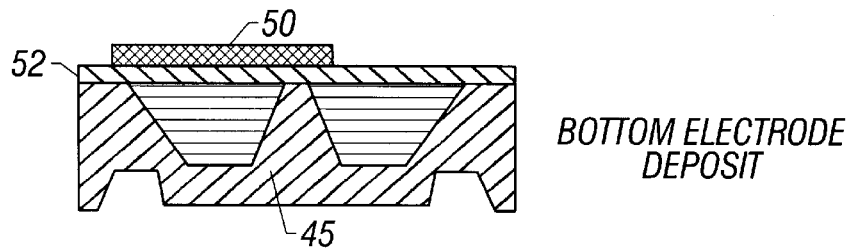
FIG. 2E — BOTTOM ELECTRODE DEPOSIT
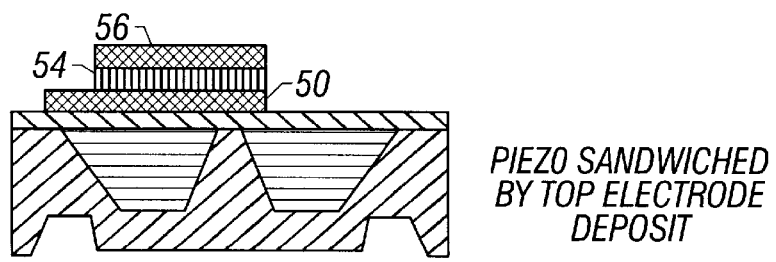
FIG. 2F — PIEZO SANDWICHED BY TOP ELECTRODE DEPOSIT
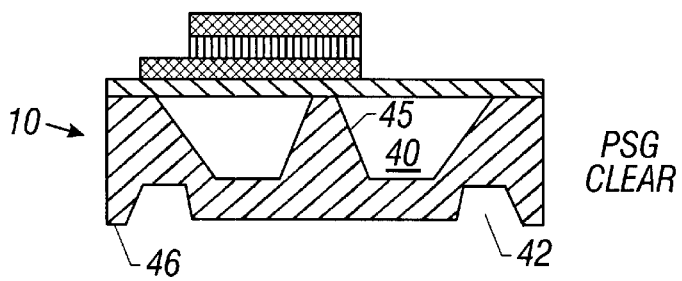
FIG. 2G — PSG CLEAR
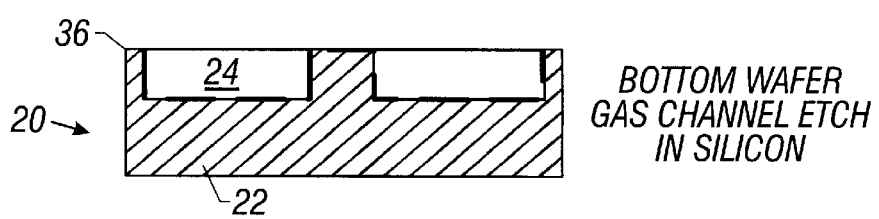
FIG. 2H — BOTTOM WAFER GAS CHANNEL ETCH IN SILICON

MICROELECTROMECHANICAL MACHINED ARRAY VALVE

FIELD OF THE INVENTION

This invention pertains to microvalves. More particularly, an array of microvalves and methods for making such arrays are provided.

BACKGROUND OF THE INVENTION

In the semiconductor industry and other industries, there is need for precise flow control or reactants and other chemicals. For example, in chemical vapor deposition (CVD) processes, there are demanding requirements for process control, particle generation control, reliability improvements and cost control (See, e.g., "Vapor delivery methods for CVD: An equipment selection guide," *Solid State Technology*, May 1996, p. 91). Some of the compounds used as precursors are corrosive to many materials used in the delivery system. Most of controlled delivery of gas-phase materials is accomplished using thermal mass flow controllers (MFCs) and control valves which are electromagnetic ("thermal needle" or solenoid), piezoelectric or lever design. An example of a lever or pivot arm valve which can be used with corrosive materials is disclosed in U.S. Pat. No. 5,314,164. In the past 10 years, solenoid and piezoelectric type valves have been the design of choice as the need for more and more precise control of gas flow in industry has become the rule.

In the past two years, niche industries have been progressing towards even more accurate gas delivery via the mass flow controller. Flow control command speed, accuracy, linearity across a broad range of flow, and repeatability are all prerequisites to more accuracy. In order to achieve these more precise delivery requirements, valve response speed and flow range resolution have to be maximized and oscillation settling time must be minimized. This movement has dictated that such MFCs now operate under digital resolution electronics instead of their classical analog versions. With this new movement to digitally controlled MFCs, to date only the piezoelectric proportionally controlled valve has shown any promise of providing the control requirements needed.

The current "state of the art" piezoelectric control valve for digital mass flow controllers, usually with a combination (stack) of piezo elements for motion range, can control flow over a range of 0–30 slm of nitrogen gas flow. The number of crystalline piezo elements employed determines the full range of compliance, stiffness, motion, capacitance, and nonlinearity.

Piezoelectric elements are very good capacitors, as opposed to thermal or solenoid valves which are not very efficient energy devices, and which lose energy through heat dissipation. In fact, piezoelectric elements retain an internal resistance on the order of $1 \times 10^{11}$ ohms. Thus, under static operation of a piezo element, virtually no current is drawn, nor power consumed, to maintain an activation state and/or position.

A term known as "creep" is an inherent part of piezoelectric actuated valves. Creep is referred to as the physical attribute of the piezo material whereby an initial step change in voltage will produce an initial response (motion) in a fraction of a millisecond, followed by a smaller change on a longer time scale. The longer term change is always in the same direction as the initial dimensional change. Creep is an inherent function of piezo elements which causes overshoot and undershoot of a commanded flow setting via the mass flow controller. If the creep is known and reproducible, it can be corrected for through a well-known table-look-up procedure. The long-term movement usually ends within about 0.3 seconds.

With piezo element valves, power dissipation is minimized but some error from hysteresis is never eliminated. Power dissipation is referenced to the tangent of the loss angle for the piezo material. Power dissipation factor is actually the measure of the "breadth" of the hysteresis loop. Hysteresis is the difference in the strain that occurs when a particular voltage is approached whether from a high or low state. A hysteresis curve is generated by plotting power dissipation extension as the applied voltage is increased from zero to maximum voltage, and back from maximum to zero voltage. Although hysteresis can be compensated for in proper digital algorithm control software (usually referenced as PID), some error is never recovered.

In addition to hysteresis errors, non-linearity of piezo elements also contributes to flow errors. Linearity is usually specified for the lower (increasing voltage) part of the curve. Linearity is defined as the maximum percent deviation of any point on the curve relative to the best straight least squares fit to the target data/position. This phenomenon occurs only at the lower end of the voltage curve because the higher voltage end of the electric field strength is approaching the limit where no further alignment of the electric dipoles inside the piezo material can occur. Over this lower operating range, it is possible to correct for the quadratic non-linearity by applying a de-rating voltage constant to compensate for some of the material non-linearity. For example, non-linearity is usually less than 7% of full scale flow for a 0–30 slm piezo element control valve.

Additionally, current piezo element control valve technology results in MFC supplier cost higher than that of other valve control technologies because the stringent manufacturing requirements of piezo elements limit the number of suppliers. Also, since the current piezo element is constructed of a piezo crystalline element usually sandwiched between two silver electrodes, operating conditions such as oxidizing, corrosive or high temperatures subject the silver elements to rapid oxidization and catastrophic electrical failure. Therefore, stringent manufacturing procedures must be put into place to assure proper yields and reduce contamination.

Another problem with current piezo technology for digitally addressed mass flow controllers is the ability of the proportional control valve to pinpoint flow rates in a repeatable manner. The goal of future digital mass flow controllers would be to reduce the envelope of flow errors associated with consecutive flow commands at the same rate. Variations which are extremely good for a proportional valve when working in semiconductor processes with geometries of 0.35 micron or more will be less satisfactory for the future processes applied to less than 0.35 micron geometry. More precise flow regimes will be needed.

Valve generated particles within the flow stream of a mass flow controller is a constant concern to the user. Some progress has been made over the past few years to reduce the amount of friction related issues which cause such particles in the gas flow path. The addition of a diaphragm material (usually 316L and/or VIM/VAR) across the seat of the valve orifice isolates most of the moving parts of the piezo element actuator, but not all friction generated particles are eliminated. Another form of particle generation occurs in mass flow controllers when reactive gases are utilized and where a dead volume within the MFC exists.

The use of ferroelectric thin films in microelectromechanical systems is known. The superior piezoelectric properties of ferroelectric ceramics make them ideal for such devices as microactuators and their use in microvalves has also been suggested. ("Ferroelectric thin films in Microelectromechanical Systems applications," *MRS Bulletin,* July, 1996, p. 59)

What is needed is a flow control valve which can be manufactured at reasonable cost, which can control flow over a wide range of values and do so with highly repeatable results, which can be made for use with a wide range of corrosive gases or liquids and in which generation of particles is minimized.

SUMMARY OF THE INVENTION

A valve is provided which provides a plurality of flow channels, the flow rate through each channel being controlled by an open or closed position of a cantilever driven by piezoelectric thin-film capacitor. Design allows for a corrosion-resistant coating to be deposited on the surfaces of the valve which are contacted by the fluid flowing through the valve.

BRIEF DESCRIPTION OF THE DRAWINGS

FIG. 2(e) is a cross-section of a single channel showing the deposition of a $Si_3N_4$ insulation layer and the bottom electrode (Pt, Ag, Au).

FIG. 2(f) is a cross-section after the deposition of the piezoelectric (PZT) element and the top electrode.

FIG. 2(g) is a cross-section after removal of the PSG through standard wet etching.

FIG. 2(h) is a cross-section of the bottom component after the In and Out channels have been etched in silicon. Flow is from left to right. The elevated structure in the middle is the valve seat.

DETAILED DESCRIPTION OF PREFERRED EMBODIMENT

Figure 1A:
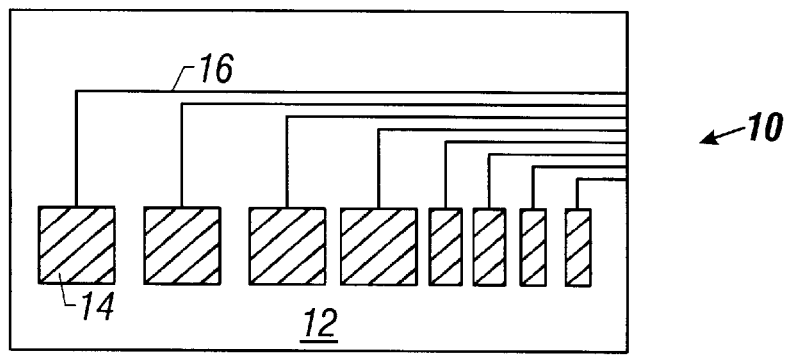
FIG. 1(a) is a top view of top component of the valve showing the layout of piezoelectrode components.

Referring to FIG. 1, FIG. 1(a) shows a top view of the top component of one embodiment of the valve of this invention. The valve is made from two components which are joined after fabrication of each component. Top component 10 includes piezoelectric valve elements 14, which will be more fully described below. To each piezoelectric valve element 14 are electrical conductors 16. Substrate 12 of this element is preferably silicon, but may be of other materials known in the art to be useful in fabrication steps to be described below.

Figure 1B:
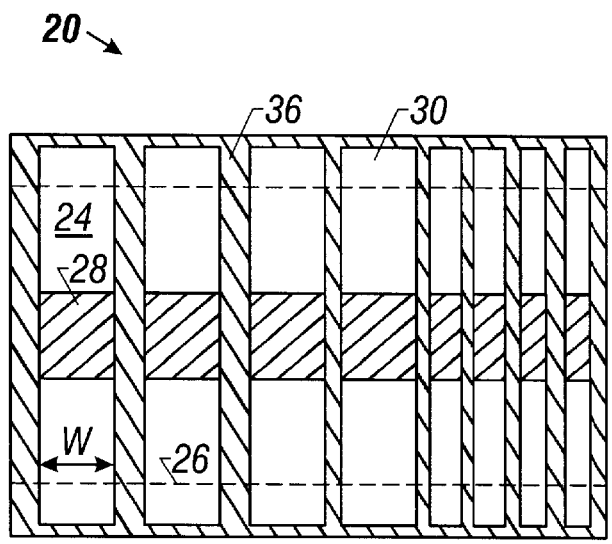
FIG. 1(b) is a top view of the bottom component of the valve showing the gas flow paths through the valve.
Figure 1C:
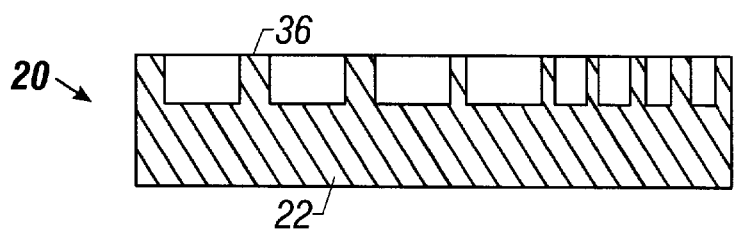
FIG. 1(c) is a cross-section of the bottom component of the valve

FIG. 1(b) shows a top view of bottom component 20 of the valve of this invention. FIG. 2(c) shows a cross-section of bottom component 20. Bottom component 20 is made from substrate 22. Flow channels 24, each having an inlet and outlet section, are formed in substrate 22 by methods to be described below. Dividers 36 separate each of a plurality of channels. Valve seats 28 separate the inflow and outflow sections of each channel of the valve. Valve seat 28 may have the same thickness of substrate 22 as dividers 36 or may be selectively formed at a preferred thickness of substrate 22 so as to form a normally-open or normally-closed valve. The plurality of channels 24 may be formed of the same width, but are preferably of varying widths, so that each independent channel 24 provides a valve capacity selected to provide the total range of flow rates desired and the resolution of flow rates which is desired. The capacity of the smallest channel 24 in the array of channels is selected to be of a size to provide maximum resolution in flow rate desired for each application. The minimum number of channels 24 is two, and the maximum number is limited only by the need for varying flow rates and resolution of flow rates, but is normally less than about 20. The width of channels may be selected to vary by a factor of 2, for example, such that total flow rate through the valve can be controlled to powers of 2 times minimum flow rate through the smallest channel. Flow rate through a channel, assuming all have the same thickness and flow across the valve seat when the valve element is open has negligible resistance, will be proportional to its width and inversely proportional to its length. As shown in FIG. 1(c), preferably the flow channels will be of uniform depth to simplify fabrication.

Figure 1D:
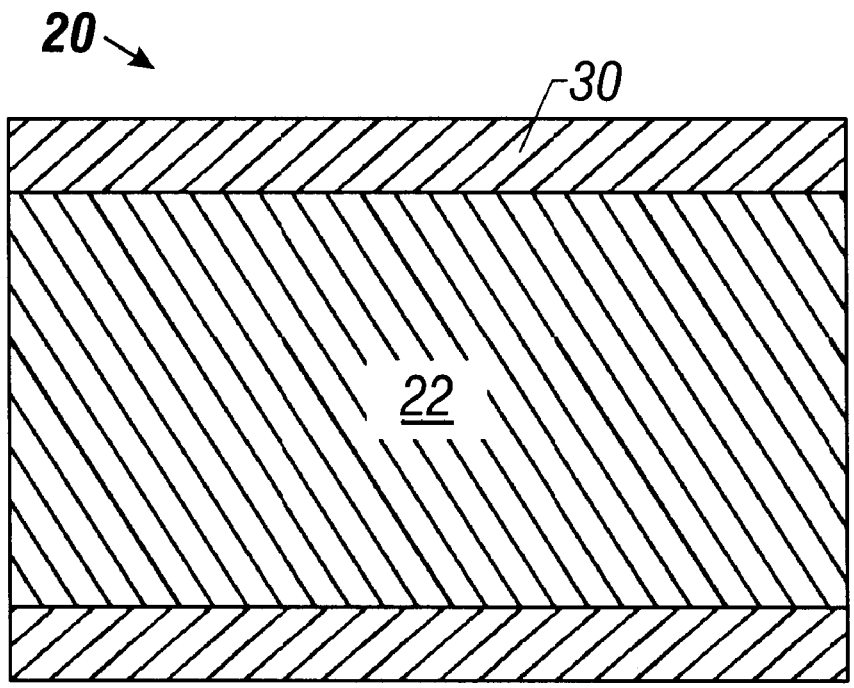
FIG. 1(d) is a bottom view of the bottom component showing the common In/Out manifolds.
Figure 1E:
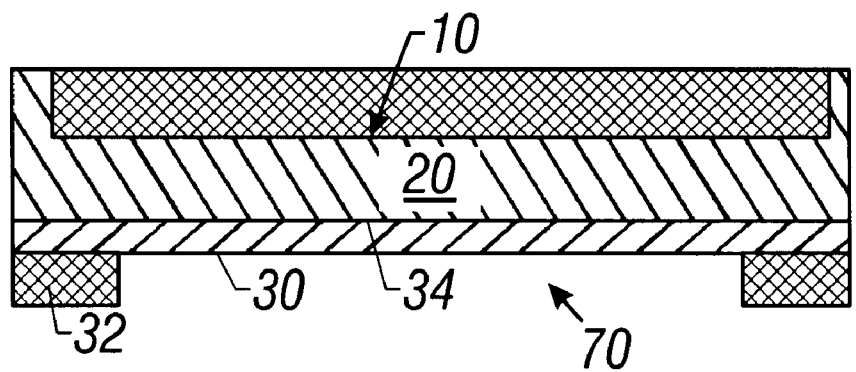
FIG. 1(e) is a cross-section view of a fully packaged digital array valve.

FIG. 1(d) shows a bottom view of bottom component 20 of the valve. Manifolds 30 for the inlet and outlet streams are shown in substrate 22, connecting the inflow and outflow sections of all channels of the valve. In FIG. 1(e), top component 10 is shown joined to bottom component 20. In addition, inflow and outflow ports 32, on each of the inflow and outflow sides have been added. Ports 32 pass through packaging wall 34. The packaging of the digital array valves should be compatible with current MFC architectures. Standard aluminum or steel housing may be utilized. FIG. 1(e) shows a cross-section of the components joined to make the valve, but for clarity does not include flow channels and valve elements described above.

Figure 2A:
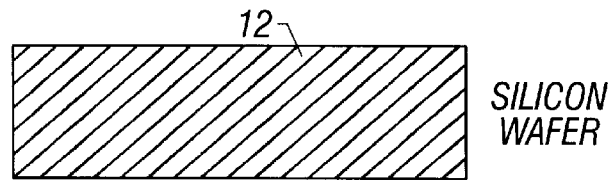
FIG. 2(a) is a cross-section view of a top silicon wafer to be used in fabrication.
Figure 2B:
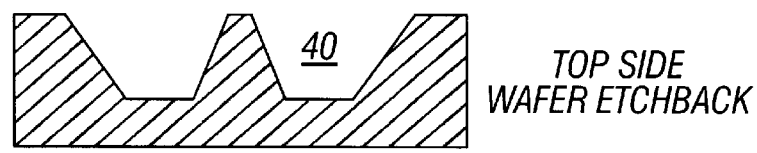
FIG. 2(b) is a cross-section view of the top silicon wafer after two top vias are etched.
Figure 2C:
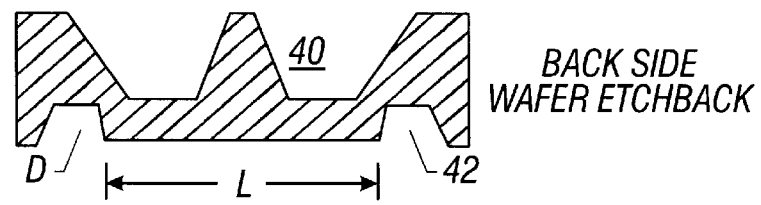
FIG. 2(c) is a cross-section view of the top silicon wafer after vias are etched on the bottom surface to form a diaphragm of dimension L recessed by distance D relative to the bottom silicon surface.
Figure 4:
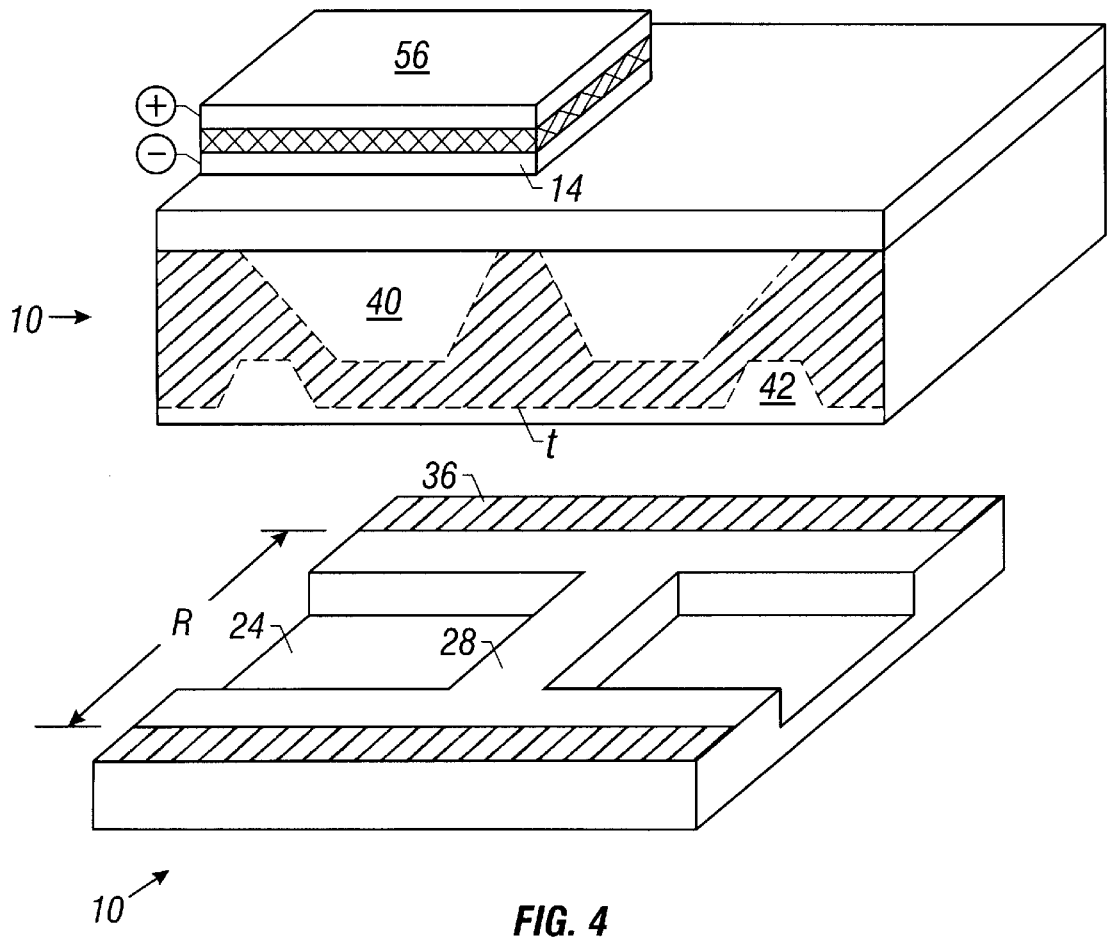
FIG. 4 is an isometric view of the top and bottom components of one element of the digital valve array.

In FIG. 2(a), substrate 12 to be used to form top component 10 is shown. The substrate may be a wafer about 400 microns thick, for example. The first step in forming the valve assembly is to etch the top side of the wafer to form vias 40. Etching may be performed with a standard wet etch process. To achieve more controlled etch profiles and higher integration densities, dry etch technologies may be implemented, using bromine, SF6, or other chemicals known in the art. After the top side of the wafer is etched as in FIG. 2(b), the wafer is etched on the opposite side to form vias 42 and, if desired, to remove thickness D from the wafer so as to provide a normally open valve. Alternatively, the thickness D is not removed. Although vias 40 and 42 are shown in cross-section in FIG. 2(c), it should be understood that vias 40 and 42 extend perpendicular to the cross-section shown for a distance at least as great as the width of the channel, such as channels 24 in FIG. 1(b), to which they will serve as valve seat. Alternatively, the vias extend for a distance equal to the distance between the sealing areas separating each channel. Sealing areas are further described below (FIG. 4). Thus, vias 40 form a rectangular pattern and provide a diaphragm made of substrate 12 having a length L as shown in FIG. 2(c) and a width at least as great as width W as shown in FIG. 1(b).

Figure 2D:
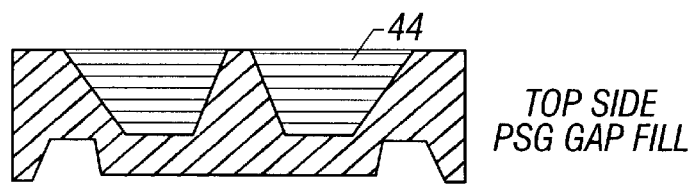
FIG. 2(d) is a cross-section view after the top vias are planarized with PSG.

The next step in the fabrication of the top component of the valve of this invention is shown in FIG. 2(d), where vias 40 have been filled with a standard spin of phosphosilicate glass as a sacrificial filling. The PSG spin-on is made flush with the substrate surface by either mechanical polishing or through standard selective wet- or dry-etch of the excess material. Vias 40 may be formed using well known photolithographic steps: (a) a polymer film is spun on the silicon substrate; (b) the resist (polymer) is then exposed to UV light through a photomask having the appropriate patterns (rectangular or circular vias); (c) the exposed resist is then removed through an acetone rinse; and (d) wet or dry etching of the exposed silicon surfaces is performed to form the vias.

FIG. 2(e) shows the first step in deposition of the piezoelectric valve element. Deposition of bottom electrode 50, which is usually platinum, may be proceeded by the deposition of a silicon nitride structural layer 52. Piezoelectric active material 54 is then deposited, as shown in FIG. 2(f). Such material may be PZT, which is a ferroelectric ceramic material in the lead lanthanum zirconate titanate family, composed of $Pb(ZR_xTi_{1-x})O_3$. Other piezoelectric or ferroelectric materials may be used. The use of ferroelectric ceramic thin films in microelectromechanical system devices is known (See: *MRS Bulletin,* July, 1996) After deposition of the piezoelectric material, top electrode 56 is deposited, which will normally be the same composition as bottom electrode 50. A patterning and etching step is then necessary to limit the deposit to the area covering diaphragm contact 45 or extending slightly therebeyond. Sacrificial glass 44 is then removed from vias 40 to form the cantilever structure shown in FIG. 2(g). The bottom and top electrodes may be connected to the external circuitry by deposition of metalization 16 using standard lithographic techniques, as shown in FIG. 1A or by ultrasonically bonded wires directly to elements 50 and 56, as shown in FIG. 2. This completes the fabrication of the upper component 10.

Bottom component 20 is formed by etching channels 24 as shown in FIG. 1(b). Standard photolithography and wet etching technology may be used. Alternatively, dry etching may be used. The cross-section of each channel and the valve seat area determine the flow rate through each individual valve element in the open position.

FIG. 2(h) shows bottom component 20 of the valve in a side view parallel to the direction of flow through the valve. Columns 36 extend around bottom component 20 except where channels 24 exist for inlet and outlet flow. If the valve is to be used in inert fluid service, top component 10 and bottom component 20 are then joined by joining column 36 of FIG. 2(h) and column 46 of FIG. 2(g), as well as sealing areas between the channels. Joining techniques for silicon are well known in the art, using ultrasonic bonding of silicon to silicon surfaces at temperatures of about 300 to about 400° C.

The valve of this invention may be modified to allow corrosive fluid service. Surfaces of the valve which are to be wetted by a corrosive fluid may be coated with a material which is not affected by corrosive gases. A preferred coating material is diamond, but other materials which may be used include titanium nitride, boron nitride, carbon nitride or combinations of such coatings.

Figure 3A:
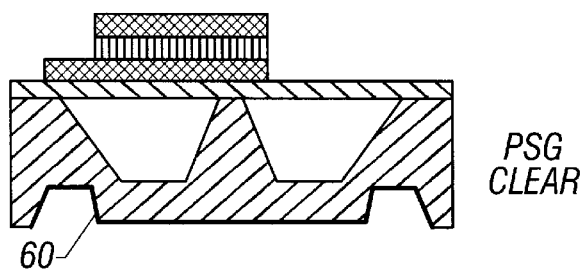
FIG. 3(a) shows the upper component of FIG. 2(g) after the bottom vias have been covered with a hard coating such as diamond or boron nitride.
Figure 3B:
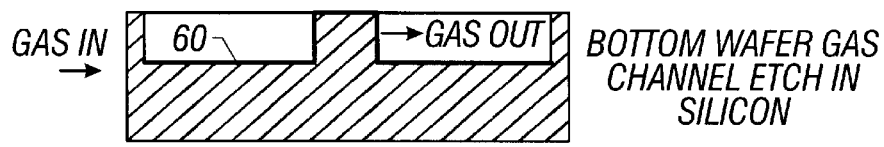
FIG. 3(b) shows the bottom component of FIG. 2(h) where a hard coating layer is deposited on top of the silicon.

The thickness of the coating may be about 200 nm, and it should be continuous and pinhole free. Suitable processes for depositing such coatings are gas-source MBE and MOCVD to deposit BN or diamond. Continuous pinhole-free films are necessary. To be compatible with the valve fabrication process, relatively low deposition temperatures are necessary, preferably below about 700° C. The coating is deposited on the wetted area of upper component 10 and lower component 20, as shown in FIG. 3(a) and FIG. 3(b). Coating 60 may be deposited as soon as the etching step illustrated in FIG. 2(c) has been completed for upper component 10 or at a later time in the steps of forming upper component 10. Coating 60 may be deposited on lower component 20 as soon as wetted surfaces are formed. After forming coating 60, component 10 and component 20 are joined, as described before. It is necessary to prevent coating of the silicon surface in areas that are to be bonded. This can be accomplished by masking the surfaces to be bonded when depositing the coating.

Referring to FIG. 4, isometric drawings of component 10 and component 20 before joining are shown. The thickness, t, of substrate left to provide deformation of the diaphragm should be in the range from about 1 micrometer to about 50 micrometers. Flow channels 24 may be of any convenient configuration. They may be v-shaped, for example. Preferably, the vias 40 extend to approximately the distance R, such that when the diaphragm is deformed to put the channel is a closed position the valve seat is covered and there is minimal, if any, leakage around the diaphragm. Alternatively, the diaphragm may be made flexible in two dimensions, or the diaphragm may be made in the form of a round area so as to cover the valve seat 28 when the channel is in a closed position.

After joining upper component 10 and lower component 20, the valve is preferably encapsulated in metal envelope 34, shown in FIG. 1(e) and down ports 32 are provided to form encapsulated valve assembly 70, shown in FIG. 1(e).

Valve assembly 70 may be calibrated using techniques well known in the art. Combinations of channels 24 provide known flow rates at selected temperature and pressure differential across valve assembly 70. Combinations of channels 24 may be selected electronically by activating piezoelectric elements 54 (FIG. 2(f)) for each channel. For a normally open valve operation, piezoelectric element 54 of each channel is selected to provide displacement and force sufficient to substantially close the selected flow channel upon activation of the piezoelectric element for that channel. Maximum pressure input to the valve assembly is limited by the minimum closing force of a valve in the valve assembly.

The foregoing disclosure and description of the invention are illustrative and explanatory thereof, and various changes in the details of the illustrated apparatus and construction and method of operation may be made without departing from the spirit of the invention.

What is claimed is:

1. A micromachined valve actuated by a piezoelectric thin-film actuator for controlling flow of a working fluid, comprising:

a top component having a plurality of piezoelectric actuators disposed such as to move a corresponding diaphragm in proximity to each of the plurality of actuators from an open to a closed position in response to application of electrical voltage to the actuator, the diaphragm having a working surface and segments having a thickness allowing deformation of the diaphragm in response to the piezoelectric actuator and being disposed such that the diaphragm is interposed between the working fluid and the piezoelectric actuator; and a bottom component having a plurality of flow channels, the flow channels having a working area, inlet sections and outlet sections and valve seat areas therebetween, the bottom component being joined to the top component such as to seal gas flow in each of the flow channels and such as to locate a diaphragm in juxtaposition with the valve seat areas such as to control flow rate through the flow channels.

2. The valve of claim 1 wherein the piezoelectric material is PZT.

3. The valve of claim 1 wherein the top component and the bottom component are made from a silicon substrate.

4. The valve of claim 1 wherein the number of flow channels is greater than 2 and less than 31.

5. The valve of claim 1 further comprising a corrosion-resistant coating on the working areas of the top and bottom components.

6. The valve of claim 5 wherein the coating is diamond.

7. The valve of claim 5 wherein the coating is selected from the group of compounds consisting of titanium nitride, boron nitride and carbon nitride and alloys of these compounds.

8. The valve of claim 1 wherein a corrosion-resistant surface on working areas is achieved by passivation of the working areas.

9. The valve of claim 1 wherein the flow capacities of the flow channels are selected to have a preferred relationship therebetween.

10. The valve of claim 1 wherein the minimum flow capacity of a flow channel is selected to have the desired resolution in flow rate of the valve.

* * * * *